United States Patent

[11] 3,588,128

| [72] | Inventor | Jorgen Hartvig Petersen<br>Nordborg, Denmark |
|---|---|---|
| [21] | Appl. No. | 729,337 |
| [22] | Filed | May 15, 1968 |
| [45] | Patented | June 28, 1971 |
| [73] | Assignee | Danfoss A/S,<br>Nordborg, Denmark |
| [32] | Priority | May 16, 1967 |
| [33] | | Germany |
| [31] | | D53092 |

[54] ROTARY SEAL, FOR OIL PUMPS
7 Claims, 1 Drawing Fig.

[52] U.S. Cl. ............................................ 277/93,
277/96
[51] Int. Cl. ....................................... F16j 15/34,
F16j 15/54
[50] Field of Search ........................................... 277/84-
—87, 93, 93 (SD), 96

[56] References Cited
UNITED STATES PATENTS

| 2,362,436 | 11/1944 | Stratford ..................... | 277/87 |
| 3,093,382 | 6/1963 | Macks ......................... | 277/96X |
| 3,312,476 | 4/1967 | Eckerle et al. ............... | 277/87 |

*Primary Examiner*—Houston S. Bell, Jr.
*Attorney*—Wayne B. Easton

ABSTRACT: A rotary seal comprises a shaft rotatably mounted in a hollow housing which has a recessed portion. Within this recess there is a ring-shaped seat portion disposed coaxially with the shaft. A stationary bearing seat member comprising a sintered carbon ring having a flat bearing surface is pressed against the ring-shaped seat by spring means. The surface of the carbon ring opposite the flat bearing surface is preferably impregnated with a material such as a metal to avoid porosity. However the impregnating material does not reach the flat bearing surface. A rotatable metal sealing ring member is pressed against the sintered carbon ring thus producing a seal between these members.

PATENTED JUN28 1971  3,588,128
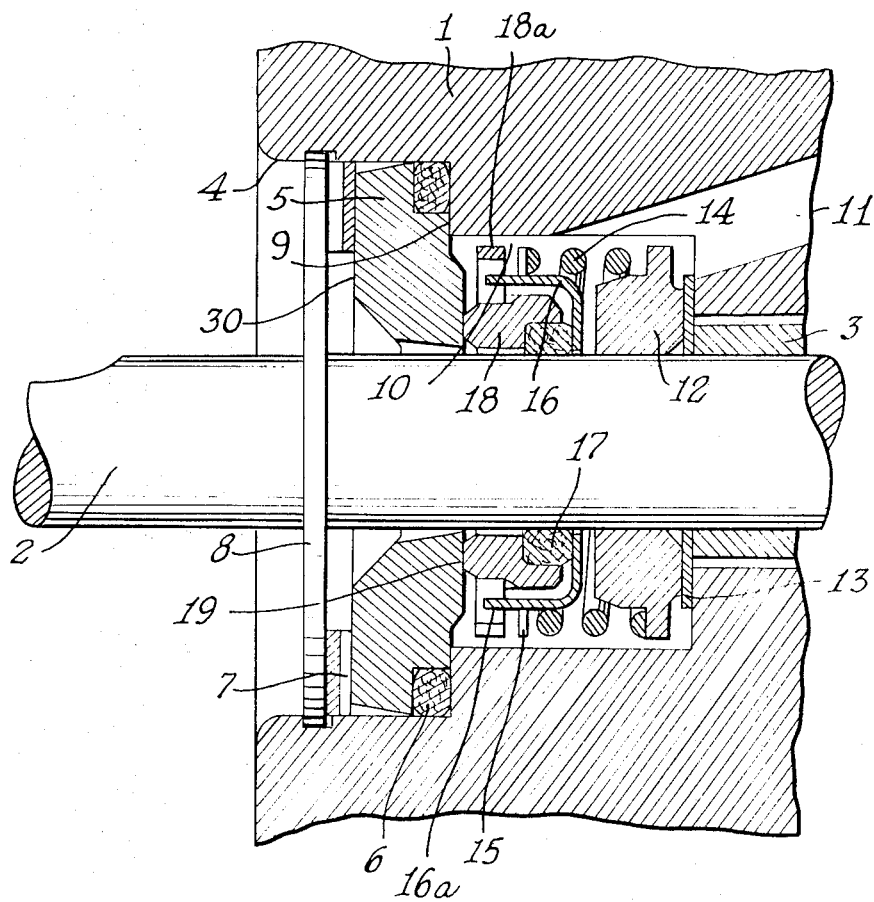
INVENTOR.
JORGEN HARTVIG PETERSEN

ROTARY SEAL, FOR OIL PUMPS

The invention relates in general to sealing devices and more particularly to rotary sealing devices for oil pumps wherein a rotating seal member is axially loaded against a stationary seat member.

Sealing devices are known wherein the stationary bearing seat is made of metal such as cast iron, steel or bronze and the rotating ring member which rotates with the shaft is made of carbon or graphite particles, impregnated throughout with a synthetic or a plastic material. Until now the synthetic resin binder means was disclosed throughout the carbon ring including the sliding surfaces with certain resultant disadvantages. It has been found that the use of such carbon rotating rings results, in the course of time, in ring-shaped grooves being formed in the metal bearing seats with consequent impairment of the sealing function. In addition, the carbon rotating ring must be made very accurately in order to hold a packing ring between itself and the shaft without objectionable pressure.

A body composed of sintered carbon or graphite particles has intrinsically better sliding properties than carbon rings having synthetic resin binders since free graphite rather than synthetic resin will be found on the sliding plane or bearing surface of such bodies. Also a sintered carbon ring has better sealing properties than a carbon ring with a synthetic resin binder or than a metal bearing seat. If the rotating ring is made of metal, no grooves will be worn on its bearing surface even if it is subjected to extensive use.

An object of this invention is to provide a rotary seal having free carbon or graphite as the sliding surface.

Another object of this invention is to provide a rotary seal having a sintered carbon or graphite stationary bearing and a metal rotating member.

Other objects and a fuller understanding of the invention may be had by referring to the following description and claims, taken in conjunction with the accompanying drawing there is illustrated a longitudinal sectional view of an oil pump housing showing a rotary seal incorporating the invention.

With reference to the drawing, pump shaft 2 is supported in bearing 3 which is mounted in pump housing 1. A ring 5, made of sintered carbon is located in a recess 4 of the housing 1. In ring 5 there is an annular groove on the outer surface in which packing ring 6 is disposed. Ring 5 is forced against end face 9 of the recess 4 by means of corrugated, or wave-type, spring washer 7, which presses against a snap-in-ring 8. Meanwhile packing ring 6 is pressed against end face 9. The carbon ring 5 seals the end of chamber 10, however oil in this chamber is subjected to the suction pressure of the pump by means of channel 11. A support ring 12, made of metal, is secured to shaft 2 and a bearing disc 13 disposed between the inner wall of chamber 10 and support ring 12. A compression spring 14 is disposed between support ring 12 and outwardly projecting fingers 15 on a dished washer 16. Force is thus exerted on packing ring 17 and on rotating ring 18, which is made of metal. The packing ring 17 is received in an annular recess in the rotating ring 18 and is of greater axial extent than the recess so that it is maintained under pressure by the action of the spring 14. The packing ring is confined in a radial direction by the outer wall of the recess and the shaft 2. Spring washer 7 is approximately 10 times as stiff as the spring 14. Packing rings 6 and 17 are made of suitable elastomeric material. The dished washer 16 has fingers 16a which engage in openings in a radially outwardly projecting portion 18a of the metal ring 18 to assure that the metal ring rotates with the shaft 2.

Carbon ring 5 and metal ring 18 are forced against each other on surface 19 and slide with respect to each other. Metal ring 18 has a small cross-sectional area in the plane of the sliding surface 19 perpendicular to the shaft axis while carbon ring 5 has a relatively larger cross-sectional area in the plane of the sliding surface 19. The corners of the ring 18 adjacent the surface 19 are preferably chamfered. Carbon ring 5 comprises sintered carbon or graphite particles. Sliding surface 19 of carbon ring 5, and the bearing surface 9 surrounding it are polished flat and parallel with respect to each other in a single operation. All other surfaces of ring 5 are left unmachined.

When the rotating ring is made of metal it is possible to provide sufficient stiffness with a small cross-sectional area. It is therefore possible to reduce the area of the sliding surface and thus reduce the friction losses in the device.

Sintered carbon rings cannot be mass-produced without conical tapers of approximately 5° on the inner and outer circumferential surfaces. This property has heretofore made the use of sintered carbon bearing rings impossible. In accordance with this invention means are provided for overcoming this difficulty. Except for the polished sliding surface 19 and parallel surface 9 for exactly positioning the carbon ring, all other surfaces may remain unmachined. The exact size of the outer circumferential surface and the inner circumferential surface is of no consequence. Irregularities in the back surface 30 and the thickness tolerance of the ring are compensated for by means of the spring 7 which also applies sealing pressure to the ring.

In case the sintering process results in a ring that is porous and is thus pervious with respect to oil, the side opposite the bearing surface may be impregnated with a material such as metal. The ring can thus be rendered absolutely impervious to fluid. The impregnated material however does not extend to the sliding surface 19.

In addition, it is recommended that a packing ring 6 be provided in a ring-shaped depression in at least one of the interengaging surfaces of the carbon ring 5 and the housing recess. This packing ring 6 provides a static seal with the help of the spring washer 7. As the packing ring is squeezed axially, it is deformed, in part, in a radially outward direction and it bears against the housing and thus helps to fix the radial position of the carbon ring.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A rotary seal between a rotating shaft and a housing having an annular radial seating surface encircling and spaced from said shaft, a sintered carbon ring encircling said shaft and having an annular bearing surface bearing on said seating surface of said housing and an annular sealing surface inwardly of said bearing surface, said sintered carbon ring having an annular recess adjacent said bearing surface, annular sealing means received in said recess and engageable with said housing, first spring means urging said sintered carbon ring toward said housing to press said bearing surface of said ring against said seating surface of the housing to position said ring and to press said annular sealing means against said housing to provide a fluidtight seal between said ring and said housing, a sealing ring rotating with and movable axially of said shaft and having an annular sealing surface engageable with said annular sealing surface of said sintered carbon ring, means providing a fluidtight seal between said sealing ring and said shaft and second spring means for pressing said sealing ring against said sintered carbon ring, said spring means acting in opposition to each other and said first spring means being stiffer than said second spring means.

2. A rotary seal according to claim 1, wherein said bearing surface and said sealing surface of said sintered carbon ring are parallel to one another and offset axially relative to one another.

3. A rotary seal according to claim 1, wherein said bearing surface and said sealing surface of said sintered carbon ring are machined and are the only surfaces of said carbon ring that are machined.

4. A rotary seal according to claim 1, wherein a portion only of said sintered carbon ring spaced from the sealing surface of said carbon ring is impregnated with metal, said metal being disposed so that no metal is present in the sealing surface of said carbon ring.

5. A rotary seal according to claim 1, wherein the sealing surface of said sintered carbon ring is of greater radial extent than the sealing surface of said sealing ring.

6. A rotary seal according to claim 1, wherein said first spring means comprises a spring washer engaging a face of said sintered carbon ring opposite said sealing surface.

7. A rotary seal according to claim 1, wherein inner and outer peripheral surfaces of said sintered carbon ring are frustoconically tapered in the same direction.